US012650857B2

(12) United States Patent
Chu

(10) Patent No.: US 12,650,857 B2
(45) Date of Patent: Jun. 9, 2026

(54) PROGRAM CALL STACK CREATION METHOD AND UNWIND STACK METHOD AND APPARATUS

(71) Applicant: HUAWEI TECHNOLOGIES CO., LTD., Shenzhen (CN)

(72) Inventor: Ning Chu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 278 days.

(21) Appl. No.: 18/600,556

(22) Filed: Mar. 8, 2024

(65) Prior Publication Data

US 2024/0211277 A1     Jun. 27, 2024

Related U.S. Application Data

(63) Continuation of application No. PCT/CN2022/117007, filed on Sep. 5, 2022.

(30) Foreign Application Priority Data

Sep. 8, 2021    (CN) .......................... 202111053834.5

(51) Int. Cl.
*G06F 9/445* (2018.01)

(52) U.S. Cl.
CPC ................................ *G06F 9/44521* (2013.01)

(58) Field of Classification Search
CPC ....................................................... G06F 21/52
See application file for complete search history.

(56) References Cited

U.S. PATENT DOCUMENTS

| | | | |
|---|---|---|---|
| 2006/0212844 A1* | 9/2006 | Goldin | G06F 9/45533 |
| | | | 717/106 |
| 2008/0270990 A1* | 10/2008 | Kornstaedt | G06F 9/4484 |
| | | | 717/126 |
| 2009/0089764 A1* | 4/2009 | Lai | G06F 9/4484 |
| | | | 717/143 |
| 2009/0172332 A1 | 7/2009 | Ono et al. | |
| 2020/0272520 A1* | 8/2020 | Senior | G06F 9/4484 |
| 2020/0285606 A1* | 9/2020 | Grant | G06F 11/3079 |
| 2022/0043908 A1* | 2/2022 | Chaffin | G06F 21/52 |

FOREIGN PATENT DOCUMENTS

| | | | | | |
|---|---|---|---|---|---|
| CN | 105556466 A | * | 5/2016 | | G06F 9/4484 |
| CN | 121093323 A | * | 12/2025 | | |
| EP | 4345612 A1 | * | 4/2024 | | G06F 11/36 |

* cited by examiner

*Primary Examiner* — Philip Wang

(57) ABSTRACT

This application discloses a program call stack creation method and apparatus, and an unwind stack method and apparatus. The call stack creation method includes: obtaining a first program, where the first program includes a first function, in a process of calling a runtime library to run the first program, adding a second function and creating a call stack, where the call stack includes a first stack frame, a second stack frame, and a third stack frame that are respectively corresponding to the first function, the second function, and a third function. An unwind stack performance can be improved to a maximum extent without affecting a non-stack trace scenario.

20 Claims, 7 Drawing Sheets

300

Obtain a first program, where the first program includes a first function — S310

In a process of calling a runtime library to run the first program, add a second function and create a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function — S320

Store a first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame — S330

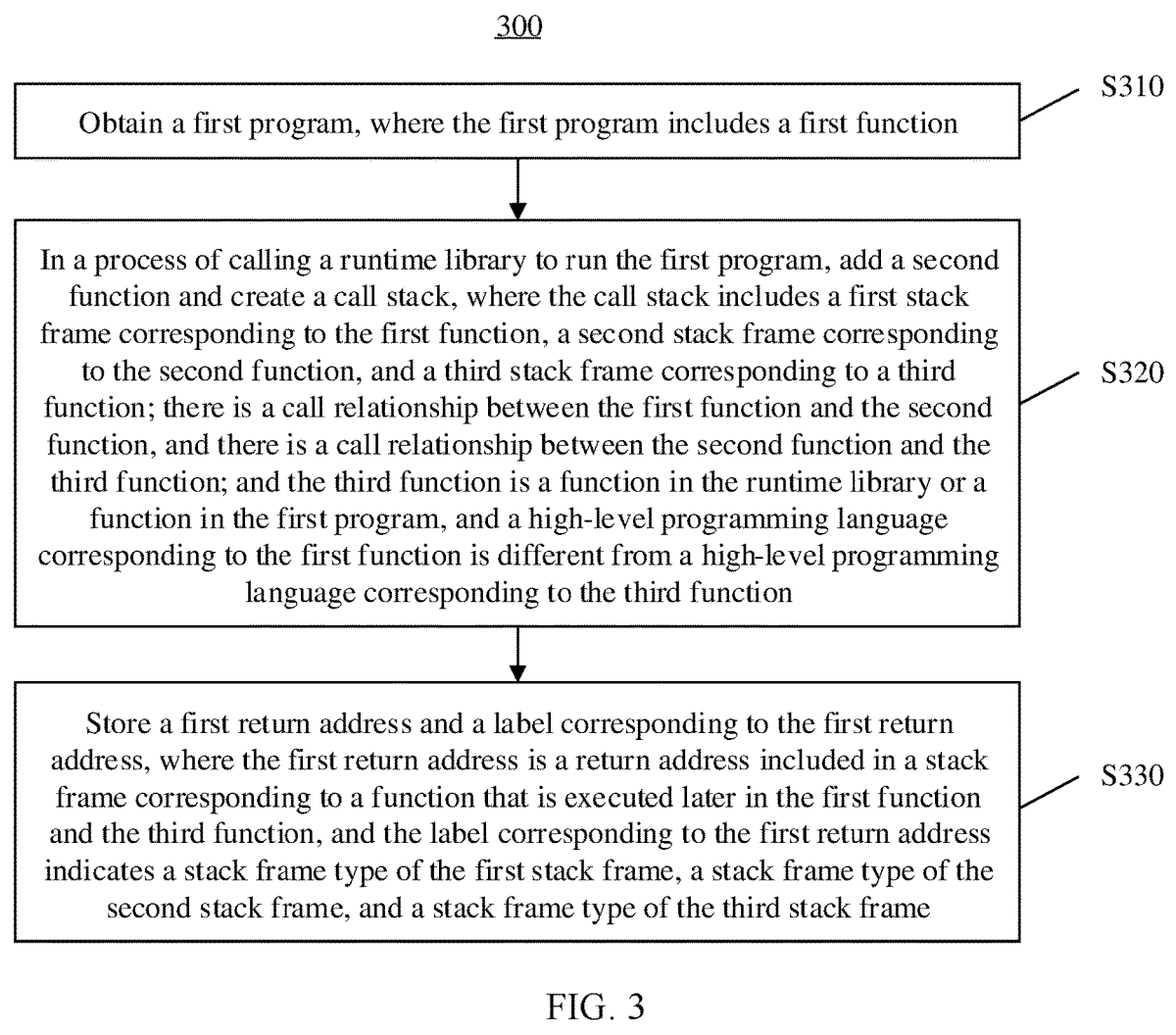

300

| Obtain a first program, where the first program includes a first function | S310 |

In a process of calling a runtime library to run the first program, add a second function and create a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function — S320

Store a first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame — S330

FIG. 3

PROGRAM CALL STACK CREATION METHOD AND UNWIND STACK METHOD AND APPARATUS

CROSS-REFERENCE TO RELATED APPLICATIONS

This application is a continuation of International Application No. PCT/CN2022/117007, filed on Sep. 5, 2022, which claims priority to Chinese Patent Application No. 202111053834.5, filed on Sep. 8, 2021. The disclosures of the aforementioned applications are hereby incorporated by reference in their entireties.

TECHNICAL FIELD

This application relates to the field of information technologies, and in particular, to a program call stack creation method and apparatus, and an unwind stack method and apparatus.

BACKGROUND

A call stack is storage space allocated in a memory to code and data in an executable file during program execution. The call stack includes a plurality of stack frames, and each stack frame corresponds to one function. Functions separately corresponding to two adjacent stack frames have a call relationship.

In program code, when a function written in one high-level programming language calls a function written in another high-level programming language, or when a high-level programming language corresponding to a runtime library is different from a high-level programming language corresponding to the program code, during program code execution, different types of stack frames appear in a call stack maintained for the program code. In this scenario, if there is an unwind stack requirement, identification of each stack frame type in a call stack in an unwind stack process becomes a key factor that affects unwind stack performance.

In the conventional technology, for the foregoing call stack having different types of stack frames, a stack frame type of each stack frame in the call stack is identified in the unwind stack process in two manners: (1) searching based on a program count (PC) register address; (2) maintaining data link tables of same stack frame types based on runtime.

When the foregoing conventional technology is used to identify stack frame types, a PC data table or a data link table needs to be maintained during runtime. Consequently, a non-unwind stack scenario is greatly affected, and a speed is low when the foregoing manner 1 is used to perform stack tracing.

SUMMARY

Embodiments of this application provide a program call stack creation method and apparatus, and an unwind stack method and apparatus, to improve unwind stack performance to a maximum extent without affecting a non-stack trace scenario.

According to a first aspect, this application provides a program call stack creation method. The method includes: obtaining a first program, where the first program includes a first function; in a process of calling a runtime library to run the first program, adding a second function and creating a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function; and storing a first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame.

A type of a stack frame matches a type of a high-level programming language of a function corresponding to the stack frame. For example, when a function corresponding to a stack frame is written in Java, a stack frame type corresponding to the stack frame is a Java stack frame.

The first program may include a plurality of functions written in one or more high-level programming languages.

It should be understood that, in this embodiment of this application, in the process of running the first program, the second function is added between the first function and the third function, so that there is the call relationship between the first function and the second function, and there is the call relationship between the second function and the third function. In other words, it indicates that there is a call relationship between the first function and the third function in high-level language code.

In an implementation, the second function is generated by using a compiler or through handwritten assembly, and is stored in a compiled high-level language code library or a compiled runtime code library.

The second function may be an assembly instruction (that is, represented in an assembly language) generated by using the compiler or through handwritten assembly, and the assembly instruction may be subsequently translated into a binary executable file (or referred to as machine code) by using an assembler. A correspondingly added boundary function (that is, the second function) is generated by using the compiler or through handwritten assembly, instead of being implemented in the high-level language code (that is, the first program), so that reusability of the boundary function can be improved.

It should be understood that, for the three functions whose call relationship is: the first function calls the second function and the second function calls the third function, in a program running process, the first function is first executed, the second function is called to execute the second function in a process of running the first function, and the third function is then called to execute the third function in a process of executing the second function. It can be learned that in this scenario, in terms of time sequence, the third function is a function that is executed later.

In terms of technical effects, for functions that have two call relationships in the high-level language code, that is, the first function and the third function, when types of the high-level programming languages corresponding to the functions are different, in a process of creating the call stack for the first program including the first function, a function (that is, the second function) is added between the first function and the third function, and the first return address pointing to the second function and the label corresponding to the first return address are stored. Because the label corresponding to the first return address indicates the stack frame type of the first stack frame, the stack frame type of the second stack frame, and the stack frame type of the third stack frame, in a scenario in which stack tracing needs to be performed subsequently, the stack frame types of the first stack frame, the second stack frame, and the third stack frame may be identified based on the label corresponding to the first return address. In comparison with a prior-art manner in which a large return address data table or data structure needs to be maintained in the runtime library in an unwind stack process, and a stack frame type is determined through table lookup, this embodiment of this application can eliminate maintenance overheads and required table lookup duration of the return address data table or data structure in the runtime library, thereby effectively shortening unwind stack duration, and significantly improving unwind stack performance without affecting a non-unwind stack scenario.

In an implementation, the first function calls the second function, the second function calls the third function, and the first return address is a return address included in the third stack frame, or the third function calls the second function, the second function calls the first function, and the first return address is a return address included in the first stack frame.

In terms of technical effects, the first function, the second function, and the third function may have the foregoing two call relationships, but the first return address is a return address in a stack frame corresponding to a function that is executed later. Therefore, in a subsequent unwind stack process, because the return address in the stack frame corresponding to the function that is executed later is first obtained, a stack frame type of a stack frame corresponding to a function that is executed first may be determined based on a label corresponding to the return address, thereby effectively shortening unwind stack duration and improving unwind stack performance.

In an implementation, the first return address is stored in a return address set, a function pointed to by each return address in the return address set is a boundary function, a call function of the boundary function and a called function of the boundary function correspond to different types of high-level programming languages, and a label corresponding to each return address indicates a stack frame type of a stack frame corresponding to the function pointed to by each return address, and indicates a stack frame type of a stack frame corresponding to a call function of the function pointed to by each return address.

It should be understood that, for any other three functions that have a same relationship with the first function, the second function, and the third function, a return address included in a stack frame corresponding to a last executed function in the other three functions and a label corresponding to the return address are also stored in the return address set.

In terms of technical effects, a return address set is used to store all return addresses pointing to boundary functions (that is, functions added in a program running process). Because a label corresponding to each return address in the return address set has a same feature as the label corresponding to the first return address, in a subsequent unwind stack process, it may be directly determined whether a return address in a current stack frame is located in the return address set to determine a stack frame type of a corresponding stack frame. In comparison with the conventional technology, this can effectively shorten unwind stack duration, and greatly improve unwind stack performance.

In an implementation, the call stack includes a fourth stack frame corresponding to a fourth function, a stack frame type of the fourth stack frame is a first type, and the stack frame type of the fourth stack frame is related to a type of a high-level programming language corresponding to the fourth function; and the method further includes: the performing stack tracing on the fourth stack frame includes: obtaining a second return address in the fourth stack frame, where the second return address points to a fifth function, and the fifth function is a function that calls the fourth function; and when the second return address belongs to the return address set, setting a stack frame type of a fifth stack frame to a second type, where the fifth stack frame is a stack frame corresponding to the fifth function, and the second type indicates that the fifth function is the boundary function; and setting a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame; or when a return address in the fourth stack frame does not belong to the return address set, setting the stack frame type of the fifth stack frame to the first type, where the fifth stack frame is the stack frame corresponding to the fifth function.

The boundary function is a function added in the process of running the first program, and the fourth stack frame is a stack frame corresponding to any non-boundary function in the call stack.

When the first function calls the second function, and the second function calls the third function, in an unwind stack process, the fourth stack frame, the fifth stack frame, and the sixth stack frame may be respectively the third stack frame, the second stack frame, and the first stack frame. When the third function calls the second function, and the second function calls the first function, in an unwind stack process, the fourth stack frame, the fifth stack frame, and the sixth stack frame may be respectively the first stack frame, the second stack frame, and the third stack frame.

In terms of technical effects, in the process of creating the call stack, a return address pointing to the boundary function is added to the return address set. Therefore, in the unwind stack process, a stack frame type of a related stack frame may be directly determined based on whether the return address belongs to the return address set and a label corresponding to the return address in the return address set. In comparison with the conventional technology in which a large return address data table or data structure is maintained in the runtime library and a stack frame type is determined through table lookup, this embodiment of this application can eliminate maintenance overheads and required table lookup duration of the return address data table or data structure in the runtime library, thereby effectively shortening unwind stack duration, and significantly improving unwind stack performance without affecting a non-unwind stack scenario.

In an implementation, the second type and the third type are two stack frame types indicated by a label corresponding to the second return address.

The label corresponding to the second return address may be a data packet format, and information in the packet may indicate the stack frame types corresponding to the fourth stack frame, the fifth stack frame, and the sixth stack frame. A sequence of packet information that respectively indicates the stack frame types of the fourth stack frame, the fifth stack frame, and the sixth stack frame is not limited in this application.

In an implementation, a frame pointer FP in the fourth stack frame is obtained. If the FP points to a stack bottom of the call stack, the unwind stack process of the fourth stack frame is ended.

In terms of technical effects, before a type of a corresponding stack frame is determined based on the return address, whether a current stack frame is located at the stack bottom of the call stack may be determined by using the FP, so as to ensure that the unwind stack process is successfully ended when the unwind stack process reaches the stack bottom of the call stack.

In an implementation, when the fourth stack frame is a stack frame at a stack top of the call stack, the first type is related to a type of a high-level programming language of the runtime library.

In terms of technical effects, when an unwind stack process is started, because a function corresponding to the stack frame at the stack top of the call stack is a function in the runtime library, a type of the stack frame at the stack top of the call stack is set to a stack frame type that is the same as a stack frame type of a high-level programming language corresponding to a function in the runtime library, to ensure that when no boundary function is encountered subsequently, a type of a stack frame corresponding to a call function of a function corresponding to a current stack frame is directly set to the first type. In this way, it is ensured that a stack frame type of each stack frame is accurately identified in the unwind stack process.

According to a second aspect, this application provides a call unwind stack method for a call stack. The call stack includes a fourth stack frame corresponding to a fourth function, a stack frame type of the fourth stack frame is a first type, the stack frame type of the fourth stack frame is related to a type of a high-level programming language corresponding to the fourth function, and the method includes: obtaining a second return address in the fourth stack frame, where the second return address points to a fifth function, and the fifth function is a function that calls the fourth function; and when the second return address belongs to a return address set, setting a stack frame type of a fifth stack frame to a second type, where a function pointed to by each return address in the return address set is a boundary function, a call function of the boundary function and a called function of the boundary function correspond to different types of high-level programming languages, the fifth stack frame is a stack frame corresponding to the fifth function, and the second type indicates that the fifth function is the boundary function; and setting a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame; or when the second return address does not belong to the return address set, setting the stack frame type of the fifth stack frame to the first type, where the fifth stack frame is the stack frame corresponding to the fifth function.

In an implementation, the second type and the third type are two stack frame types indicated by a label corresponding to the second return address. A label corresponding to each return address indicates a stack frame type of a stack frame corresponding to a function pointed to by each return address, and indicates a stack frame type of a stack frame corresponding to a caller function of the function pointed to by each return address.

In an implementation, a frame pointer FP in the fourth stack frame is obtained. If the FP points to a stack bottom of the call stack, the unwind stack process is ended.

In an implementation, when the fourth stack frame is a stack frame at a stack top of the call stack, the first type is related to a type of a high-level programming language of a runtime library.

In an implementation, the call stack is created in a process of calling the runtime library to run a first program, the first program includes a first function, the call stack includes a first stack frame corresponding to the first function, a second stack frame corresponding to a second function, a third stack frame corresponding to a third function, and the second function is a function added in a process of creating the call stack; there is a call relationship between the first function and the second function, and there is a call relationship between the second function and the third function; and the third function is a function in the first program or a function in the runtime library, and a high-level programming language corresponding to the first function is different from a high-level programming language corresponding to the third function. A first return address and a label corresponding to the first return address is stored, the first return address is a return address included in a stack frame corresponding to a function that is executed later in the first function and the third function, the label corresponding to the first return address indicates a stack frame type of the first stack frame, a stack frame type of the second stack frame, and a stack frame type of the third stack frame, and the first return address belongs to the return address set.

In an implementation, the first function calls the second function, the second function calls the third function, and the first return address is a return address included in the third stack frame, or the third function calls the second function, the second function calls the first function, and the first return address is a return address included in the first stack frame.

In an implementation, the second function is generated by using a compiler or through handwritten assembly, and is stored in a compiled high-level language code library or a compiled runtime code library.

According to a third aspect, this application provides a program call stack creation apparatus. The apparatus includes: an obtaining unit, configured to obtain a first program, where the first program includes a first function; a processing unit, configured to: in a process of calling a runtime library to run the first program, add a second function and create a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function; and a storage unit, configured to store a first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame.

In an implementation, the first function calls the second function, the second function calls the third function, and the first return address is a return address included in the third stack frame, or the third function calls the second function, the second function calls the first function, and the first return address is a return address included in the first stack frame.

In an implementation, the second function is generated by using a compiler or through handwritten assembly, and is stored in a compiled high-level language code library or a compiled runtime code library.

In an implementation, the first return address is stored in a return address set, a function pointed to by each return address in the return address set is a boundary function, a call function of the boundary function and a called function of the boundary function correspond to different types of high-level programming languages, and a label corresponding to each return address indicates a stack frame type of a stack frame corresponding to the function pointed to by each return address, and indicates a stack frame type of a stack frame corresponding to a call function of the function pointed to by each return address.

In an implementation, the call stack includes a fourth stack frame corresponding to a fourth function, a stack frame type of the fourth stack frame is a first type, and the stack frame type of the fourth stack frame is related to a type of a high-level programming language corresponding to the fourth function. The processing unit is further configured to perform stack tracing on the fourth stack frame. In the unwind stack process, the processing unit is configured to: indicate the obtaining unit to obtain a second return address in the fourth stack frame, where the second return address points to a fifth function, and the fifth function is a function that calls the fourth function; and when the second return address belongs to the return address set, set a stack frame type of a fifth stack frame to a second type, where the fifth stack frame is a stack frame corresponding to the fifth function, and the second type indicates that the fifth function is the boundary function; and set a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame; or when a return address in the fourth stack frame does not belong to the return address set, set the stack frame type of the fifth stack frame to the first type, where the fifth stack frame is the stack frame corresponding to the fifth function.

In an implementation, the second type and the third type are two stack frame types indicated by a label corresponding to the second return address.

In an implementation, the obtaining unit is further configured to obtain a frame pointer FP in the fourth stack frame. The processing unit is further configured to: when the FP points to a stack bottom of the call stack, end the unwind stack process of the fourth stack frame.

In an implementation, when the fourth stack frame is a stack frame at a stack top of the call stack, the first type is related to a type of a high-level programming language of the runtime library.

According to a fourth aspect, an embodiment of this application provides an unwind stack apparatus. A call stack includes a fourth stack frame corresponding to a fourth function, a stack frame type of the fourth stack frame is a first type, the stack frame type of the fourth stack frame is related to a type of a high-level programming language corresponding to the fourth function, and the apparatus includes: an obtaining unit, configured to obtain a second return address in the fourth stack frame, where the second return address points to a fifth function, and the fifth function is a function that calls the fourth function; and a processing unit, configured to: when the second return address belongs to a return address set, set a stack frame type of a fifth stack frame to a second type, where a function pointed to by each return address in the return address set is a boundary function, a call function of the boundary function and a called function of the boundary function correspond to different types of high-level programming languages, the fifth stack frame is a stack frame corresponding to the fifth function, and the second type indicates that the fifth function is the boundary function; and set a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame. Alternatively, when the second return address does not belong to the return address set, the processing unit sets the stack frame type of the fifth stack frame to the first type. The fifth stack frame is the stack frame corresponding to the fifth function.

In an implementation, the second type and the third type are two stack frame types indicated by a label corresponding to the second return address. A label corresponding to each return address indicates a stack frame type of a stack frame corresponding to a function pointed to by each return address, and indicates a stack frame type of a stack frame corresponding to a caller function of the function pointed to by each return address.

In an implementation, the obtaining unit is further configured to obtain a frame pointer FP in the fourth stack frame. The processing unit is further configured to: when the FP points to a stack bottom of the call stack, end an unwind stack process of the fourth stack frame.

In an implementation, when the fourth stack frame is a stack frame at a stack top of the call stack, the first type is related to a type of a high-level programming language of a runtime library.

In an implementation, the call stack is created in a process of calling the runtime library to run a first program, the first program includes a first function, the call stack includes a first stack frame corresponding to the first function, a second stack frame corresponding to a second function, a third stack frame corresponding to a third function, and the second function is a function added in a process of creating the call stack; there is a call relationship between the first function and the second function, and there is a call relationship between the second function and the third function; and the third function is a function in the first program or a function in the runtime library, and a high-level programming language corresponding to the first function is different from a high-level programming language corresponding to the third function. The apparatus further includes a storage unit. The storage unit is configured to: store a first return address and a label corresponding to the first return address. The first return address is a return address included in a stack frame corresponding to a function that is executed later in the first function and the third function, the label corresponding to the first return address indicates a stack frame type of the first stack frame, a stack frame type of the second stack frame, and a stack frame type of the third stack frame, and the first return address belongs to the return address set.

In an implementation, the first function calls the second function, the second function calls the third function, and the first return address is a return address included in the third stack frame, or the third function calls the second function, the second function calls the first function, and the first return address is a return address included in the first stack frame.

In an implementation, the second function is generated by using a compiler or through handwritten assembly, and is stored in a compiled high-level language code library or a compiled runtime code library.

According to a fifth aspect, this application provides a chip system. The chip system includes at least one processor, a memory, and an interface circuit, the memory, the interface circuit, and the at least one processor are interconnected through a line, the at least one memory stores instructions, and when the instructions are executed by the processor, the method according to any implementation in the first aspect and/or the second aspect is implemented.

According to a sixth aspect, this application provides a computer-readable storage medium. The computer-readable storage medium stores program instructions, and when the program instructions are run on one or more processors, the method according to any implementation in the first aspect and/or the second aspect is implemented.

According to a seventh aspect, this application provides a computer program product. When the computer program product runs on a computer device, the method according to any implementation in the first aspect and/or the second aspect is implemented.

BRIEF DESCRIPTION OF DRAWINGS

The following describes the accompanying drawings used in embodiments of this application.

FIG. 3 is a flowchart of a program call stack creation method according to an embodiment of this application;

DESCRIPTION OF EMBODIMENTS

Figure 1:
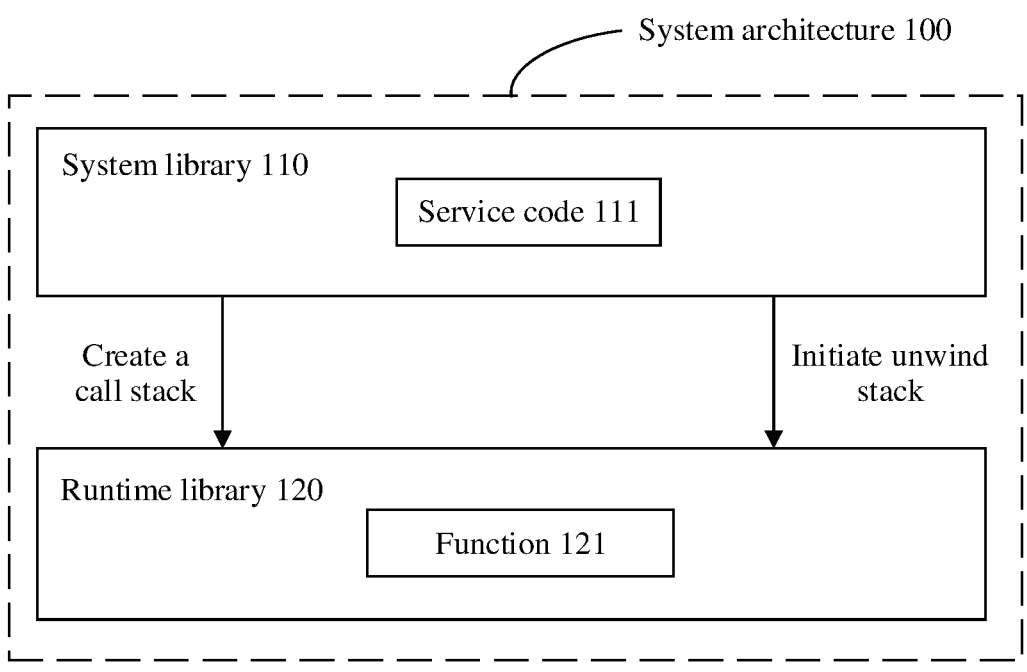
FIG. 1 is a diagram of a system architecture according to an embodiment of this application.

The following describes embodiments of this application with reference to the accompanying drawings in embodiments of this application. In this specification, claims, and accompanying drawings of this application, the terms "first", "second", and "third" are intended to distinguish between different objects but do not indicate a particular order. Similarly, the terms "fourth", "fifth", and "sixth" are also intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. An "embodiment" mentioned in this specification means that a particular feature, structure, or characteristic described with reference to this embodiment may be included in at least one embodiment of this application. The phrase shown in various locations in this specification may not necessarily refer to a same embodiment, and is not an independent or optional embodiment exclusive from another embodiment. It is explicitly and implicitly understood by persons skilled in the art that embodiments described in this specification may be combined with another embodiment.

First, related terms in embodiments of this application are explained.

(1) Stack frame: A stack frame indicates a part of stack space that is allocated separately for a function call. A stack frame corresponding to each function may be used to store a local variable of the function, a parameter transferred to a called function, a return value of a return function, and a return address of the function.

(2) Unwind stack: An unwind stack is also referred to as a stack trace. This indicates a process of tracing a stack frame of a function at each layer upwards based on a program call stack.

(3) Hybrid stack: When high-level language code includes functions written in different high-level programming languages, or a programming language of high-level language code is different from a programming language of a runtime function, in a process of running the high-level language code, a created call stack includes different types of stack frames, and the call stack is a hybrid stack. In the hybrid stack, a type of each stack frame matches a high-level programming language of a function corresponding to the stack frame.

(4) Return address: A return address refers to an address of an instruction that should continue to be executed by a call function after the call function is returned, that is, an address of a next instruction of a call point instruction (an instruction corresponding to code on which a function call happens), that is, a return address included in a stack frame corresponding to a called function points to the call function.

(5) Runtime library: A runtime library is also referred to as a runtime environment or a runtime system, and is also referred to as a runtime for short; and is a code library that supports execution of high-level language code. In most scenarios, a programming language of the runtime library is different from a high-level language in which code needs to be executed.

(6) Runtime function: A runtime function is a function in runtime. In most scenarios, a function in a runtime library is different from a function in a high-level language program to be executed.

(7) Compiler: A compiler is a tool used to compile high-level language code to be executed and a runtime code library that supports high-level language code execution. After compilation, both the high-level language code and the runtime code library become binary executable programs.

(8) Frame pointer (FP): A frame pointer points to the stack bottom of a current stack frame.

(9) Stack pointer (SP): A stack pointer points to the stack top of a call stack.

(10) Code logic: Code logic is an expected behavior implemented by product code in a product, and the code is directly written by a programmer in a high-level language. The product may be any terminal device, for example, a mobile phone, a computer, a watch, a band, or a vehicle-mounted terminal.

(11) High-level programming language (HLPL): A high-level programming language is a programming language independent of a machine and oriented to a process or an object. This is a programming language based on a human daily language, and is expressed in words or characters that are easy to accept, which has high readability, so that people who have little knowledge of a computer can understand content of the computer. Basic, Java, C, C++, Python, and the like may be included. An assembly language is a programming language between the high-level programming language and a machine language (also referred to as machine code), and is generally not considered as a high-level programming language.

The following briefly describes a conventional technology related to this application. In the conventional technology, in an unwind stack process of a hybrid stack, there are mainly two manners of identifying a stack frame type.

(1) Search Based on a PC Address

In this manner, a large PC data table needs to be created and maintained in a runtime library, and a correspondence between a return address in each stack frame and a stack frame type is stored in the data table. In an unwind stack process, a return address pointing to each function is searched for in a data table, to determine a stack frame type of a stack frame in which the return address is located.

In this manner, the PC data table needs to be maintained during running. Therefore, the table needs to be updated each time a system library (which stores machine code compiled by using high-level language code) is loaded or unloaded. The data table is used only in the unwind stack process, and in a non-stack trace scenario, extra overheads during running are increased. In addition, in the unwind stack process, the return address in each stack frame needs to be searched for in the PC data table to determine the type of the stack frame. This causes poor stack trace performance.

(2) Maintain a Data Link Table in the Runtime Library.

In this solution, a data link table of a stack frame type needs to be maintained in the runtime library. Each time service code in a system library is invoked to a runtime, stack frame information of a high-level language in the system library is inserted into the link table. When the service code in the system library is returned from the runtime, the information in the link table is deleted. When the service code in the system library initiates stack tracing, in an unwind stack operation, stack information of the high-level language is directly obtained from the data link table of the stack frame type, and stack tracing starts.

The link table data needs to be updated each time the service code calls a function in the runtime library. If no unwind stack operation is initiated subsequently, such an update operation is meaningless overheads. Therefore, this solution has a great impact on performance in a non-unwind stack scenario.

FIG. 1 is a diagram of a system architecture according to an embodiment of this application. As shown in FIG. 1, the system architecture 100 includes a system library 110 and a runtime library 120. The system library 110 includes service code 111 (that is, a second program in the following embodiment) for execution, that is, machine code obtained after high-level language code (that is, a first program in the following embodiment) is compiled. The runtime library 120 provides a corresponding runtime environment for execution of the service code 111. The runtime library 120 may provide a corresponding interface for invoking a function 121 in the runtime library when the service code 111 is executed.

In a process of executing the service code 111, a corresponding call stack is created for the service code 111. The call stack includes a plurality of stack frames, and each of the plurality of stack frames is corresponding to one function in the service code or the runtime library. In a process of executing the service code, an unwind stack process may be executed or not executed based on a service requirement.

The following describes an application scenario to which embodiments of this application are applicable.

Embodiments of this application may be applied to various scenarios in which stack tracing needs to be performed, for example, a program crashes or a call stack is exceptional, and may be a scenario in which stack tracing needs to be performed, such as garbage collection (GC).

(1) Program Crash

When a crash occurs in an execution process of a program, stack tracing may be performed to print and save information of the error program, that is, to accurately locate a level of function that crashes during calling.

(2) Call Stack Exception

When no crash occurs in the execution process of the program, code can be executed normally. When an expected exception occurs in the running process, stack tracing may be performed to obtain information about the entire running process.

Garbage collection: Garbage collection indicates a process of running a garbage collection GC algorithm to release a superblock in a memory, and indicates that an active page in a plurality of superblocks to one idle superblock, to release the plurality of superblocks and carry subsequent write of valid data.

Figure 2:
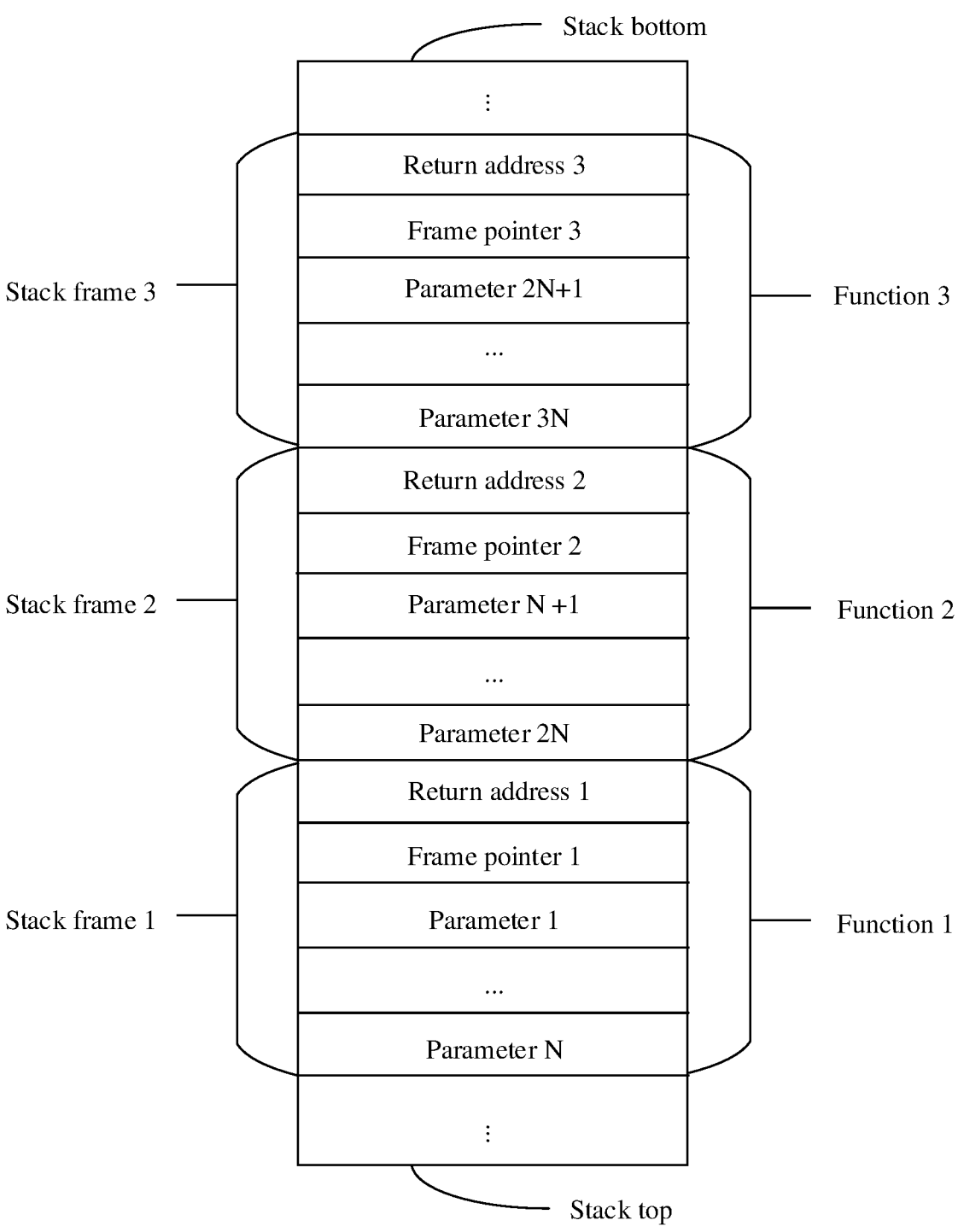
FIG. 2 is a diagram of a program call stack according to an embodiment of this application.

FIG. 2 is a diagram of a structure of a program call stack according to an embodiment of this application. As shown in FIG. 2, the program call stack may include a plurality of stack frames. The following describes the structure of the call stack by using three adjacent stack frames (a stack frame 1, a stack frame 2, and a stack frame 3) in the call stack as an example.

As shown in FIG. 2, the stack frame 3, the stack frame 2, and the stack frame 1 are sequentially located from the stack bottom to the stack top, and respectively correspond to a function 3, a function 2, and a function 1, that is, a parameter related to the function 3 is stored in the stack frame 3, a parameter related to the function 2 is stored in the stack frame 2, and a parameter related to the function 1 is stored in the stack frame 1. A call relationship between the three functions is: The function 3 calls the function 2, and the function 2 calls the function 1.

Each stack frame stores a return address, a frame pointer, and N parameters, where N is a positive integer. The return address in each stack frame points to a call function of a function corresponding to the stack frame. For example, in a process in which the function 2 calls the function 1, after the call ends, a storage address of a next instruction of a call point instruction is mapped to a return address 1, and the return address 1 returns to the function 2 after the function 1 is executed, so that the function 2 continues to run. A stack pointer FP points to the stack bottom of a current stack frame. For example, a frame pointer 1 points to a stack bottom address of the stack frame 1.

FIG. 3 is a flowchart of a program call stack creation method according to an embodiment of this application. As shown in FIG. 3, the method 300 includes steps S310, S320, and S330.

Step S310: Obtain a first program, where the first program includes a first function.

The first program may be a program written by a program developer by using a high-level programming language. The high-level language may be Basic, Java, C, C++, Python, or the like. This is not limited in this application. The first program may include a plurality of layers of functions that have a call relationship. The plurality of layers of functions that have a call relationship may be written in one high-level programming language, or may be written in a plurality of different high-level programming languages. This is not limited in this application.

Step S320: In a process of calling a runtime library to run the first program, add a second function and create a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function.

In the process of calling the runtime library to run the first program, that the second function is added and the call stack is created includes: compiling the first program written in a high-level language to obtain a compiled binary executable program; and compiling the runtime library written in a high-level language to obtain a compiled runtime code library (binary). Then, hardware such as a processor calls the compiled runtime code library, to run a binary executable file corresponding to the first program, and create the call stack. The call stack includes a stack frame corresponding to each executed function in the running process.

The compilation process may include a preprocessing phase, a compilation phase, an assembly phase, and a linking phase. Details about the compilation process are not described in this application.

The binary executable program is a machine language instruction that can be directly executed by the hardware such as the processor, that is, the binary executable file.

The runtime library may provide a corresponding runtime environment for running of the first program. The runtime library may include a code library, a framework, a platform, and the like that are required when the first program is executed. It should be noted that when the first program is run, corresponding compilation also needs to be performed on the runtime library, and then a corresponding runtime environment is provided for running of the first program based on the compiled runtime library.

In a process of executing the first program based on the compiled runtime library, an interface provided by the runtime library may be called to call a corresponding function in the compiled runtime library, to support execution of the first program.

The first function is any function in the first program.

The first function and the third function are two functions that have a call relationship in high-level language code. The first function and the third function may be two functions that have a call relationship in the first program, or the first function is a function in the first program, and the third function is a function in the runtime library.

In the process of calling the runtime library to run the first program, that the second function is added and the call stack is created includes: for the first function and the third function that have a call relationship in the high-level language and that are written in different high-level languages, the second function is added between the first function and the third function in the running process. In addition, the corresponding second stack frame is maintained for the second function in the call stack.

The second function corresponding to the second stack frame has the call relationship with the first function corresponding to the first stack frame, and the second function corresponding to the second stack frame has the call relationship with the third function corresponding to the third stack frame.

In an implementation, the first function calls the second function, the second function calls the third function, and the first return address is a return address included in the third stack frame, or the third function calls the second function, the second function calls the first function, and the first return address is a return address included in the first stack frame.

The first function, the second function, and the third function described above may have the following two call relationships.

(1) The first function calls the second function, and the second function calls the third function.

The first return address is a return address included in the third stack frame corresponding to the third function, a return address included in the third stack frame points to the second function, and a return address included in the second stack frame points to the first function.

In this case, a code library to which the first function and the third function belong may include two cases: (1) The first function and the third function may be both functions in the first program, that is, in the first program, the first function calls the third function, and the first function and the third function correspond to different high-level programming languages. For example, the first function may be written in a Java language, and the third function is written in C++. (2) The first function is the function in the first program, and the third function is the function in the runtime library.

In a process of executing the first program, the first function calls the third function in the runtime library. Because the high-level programming language corresponding to the first function is different from the high-level programming language corresponding to the third function, the second function may be added between the third function of the first function, so that the first function calls the third function by using the second function. In this case, the first function is a function at the last layer in a multi-layer function call relationship in the first program.

(2) The third function calls the second function, and the second function calls the first function.

The first return address is the return address included in the first stack frame corresponding to the first function, the return address included in the first stack frame points to the second function, and the return address included in the second stack frame points to the third function.

In this case, a code library to which the first function and the third function belong may include two cases: (1) The first function and the third function may be both functions in the first program, that is, in the first program, the third function calls the first function, and the first function and the third function correspond to different high-level programming languages. For example, the first function may be written in a Java language, and the third function is written in C++. (2) The first function is the function in the first program, and the third function is the function in the runtime library. In a process of executing the first program, the third function in the runtime library calls the first function in the first program. Because the high-level programming language corresponding to the first function is different from the high-level programming language corresponding to the third function, the second function may be added between the third function of the first function, so that the third function calls the first function by using the second function. In this case, the first function is a function at the first layer in the multi-layer function call relationship in the first program.

The high-level programming language corresponding to the first function is a high-level programming language for writing the first function. A high-level programming language corresponding to another function in this embodiment of this application is similar. Details are not described herein again.

In terms of technical effects, the first function, the second function, and the third function may have the foregoing two call relationships, but the first return address is a return address in a stack frame corresponding to a function that is executed later. Therefore, in a subsequent unwind stack process, because the return address in the stack frame corresponding to the function that is executed later is first obtained, a stack frame type of a stack frame corresponding to a function that is executed first may be determined based on a label corresponding to the return address, thereby effectively shortening unwind stack duration and improving unwind stack performance.

In an implementation, the second function is generated by using a compiler or through handwritten assembly, and is stored in a compiled high-level language code library or a compiled runtime code library.

The second function may also be referred to as a boundary function. The second function may be an assembly instruction (that is, represented in an assembly language) generated by using the compiler or through handwritten assembly, and the assembly instruction may be subsequently translated into a binary executable file (or referred to as machine code) by using an assembler. The second function is irrelevant to code logic in the first program and code logic in the runtime library, that is, the second function does not exist in the code library and the runtime library that are written in the high-level language.

In terms of technical effects, a correspondingly added boundary function (that is, the second function) is generated by using the compiler or through handwritten assembly, instead of being implemented in high-level language code (that is, the first program), so that reusability of the boundary function can be improved.

Step S330: Store the first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame.

That the first return address is a return address included in a stack frame corresponding to a function that is executed later in the first function and the third function is: (1) When the first function calls the second function, and the second function calls the third function, a function that is executed later is the third function. In a program running process, the first function is first executed; in a process of running the first function, the second function is executed by calling the first function, the second function is executed by calling the second function; and in a process of executing the second function, the third function is executed by calling the third function. In this scenario, in terms of time sequence, the third function is a function that is executed later. (2) Alternatively, when the third function calls the second function, and the second function calls the first function, a function that is executed later is the first function. In a program running process, the third function is first executed; in a process of running the third function, the second function is executed by calling the second function; and in a process of executing the second function, the first function is executed by calling the first function. In terms of time sequence, the first function is a function that is executed later.

In the process of running the first program and creating the call stack, the first return address and the label corresponding to the first return address are stored, and the label corresponding to the first return address indicates the type of the first stack frame, the type of the second stack frame, and the type of the third stack frame.

A type of a stack frame matches a high-level programming language of a function corresponding to the stack frame. For example, when a function corresponding to a stack frame is written in Java, a stack frame type corresponding to the stack frame is a Java stack frame.

The following uses two examples to describe an data packet format of a label corresponding to a return address.

Example 1: When the third function calls the second function, and the second function calls the first function, the first return address is located in the first stack frame, and the label corresponding to the first return address may be unwindPCforN2CStub. The character "N" in the label may be used to indicate that the third function is Native, that is, a function in the runtime library. In this case, the type of the third stack frame matches the high-level programming language in which the runtime library is written. The character "C" in the label may be used to indicate that the first function is a function in the first program written in the high-level language, and therefore, the type of the first stack frame matches a type of the high-level programming language corresponding to the first program. The character "stub" in the label may be used to indicate that the second function is a boundary function (or referred to as a stub function), and the type of the second stack frame is a boundary stack frame (or a stub stack frame).

Example 2: When the first function calls the second function, and the second function calls the third function, the first return address is located in the third stack frame, and the label corresponding to the first return address may be unwindPCforC2NStub. The character "C" in the label may be used to indicate that the first function is Native, that is, a function in the runtime library. In this case, the type of the first stack frame matches the high-level programming language in which the runtime library is written. The character "N" in the label may be used to indicate that the third function is a function in the first program written in high-level language, and therefore, the type of the third stack frame matches the type of the high-level programming language corresponding to the first program. The character "stub" in the label may be used to indicate that the second function is a boundary function (or referred to as a stub function), and the type of the second stack frame is a boundary stack frame (or a stub stack frame).

It should be understood that the foregoing example merely lists two feasible data packet formats of the label corresponding to the return address. Persons skilled in the art may use another data packet format to represent a label corresponding to each return address in a return address set, or use different characters to indicate a stack frame type of a corresponding stack frame. This is not limited in this application.

In an implementation, the first return address is stored in the return address set, a function pointed to by each return address in the return address set is a boundary function, a call function of the boundary function and a called function of the boundary function correspond to different types of high-level programming languages, and the label corresponding to each return address indicates a stack frame type of a stack frame corresponding to the function pointed to by each return address, and indicates a stack frame type of a stack frame corresponding to a call function of the function pointed to by each return address.

The boundary function is a function added in the process of creating the call stack, and is irrelevant to the code logic in the first program and the code logic in the runtime library. That is, the boundary function does not exist in the code library and the runtime library written in the high-level language. The boundary function includes the second function in the foregoing embodiment.

The code logic refers to a function implemented by a program written by a program developer by using a high-level programming language.

The call function of the boundary function refers to a function that calls the boundary function, and the called function of the boundary function refers to a function that is called by the boundary function.

The label corresponding to each return address indicates the stack frame type of the stack frame corresponding to the function pointed to by each return address, and indicates the stack frame type of the stack frame corresponding to a call function of the function pointed to by each return address. For details, refer to descriptions of the label corresponding to the first return address. Details are not described herein again.

In terms of technical effects, a return address set is used to store all return addresses pointing to boundary functions (that is, functions added in a program running process). Because a label corresponding to each return address in the return address set has a same feature as the label corresponding to the first return address, in a subsequent unwind stack process, it may be directly determined whether a return address in a current stack frame is located in the return address set to determine a stack frame type of a corresponding stack frame. In comparison with the conventional technology, this can effectively shorten unwind stack duration, and greatly improve unwind stack performance.

For a service scenario in which stack tracing needs to be performed, tracing may be performed on a call stack created in the running process of the first program. The unwind stack process starts from the stack top of the call stack and ends at the stack bottom of the call stack.

The following uses a fourth stack frame as an example to describe an unwind stack process in the call stack in detail.

In an implementation, the call stack includes the fourth stack frame corresponding to a fourth function, a stack frame type of the fourth stack frame is a first type, and the stack frame type of the fourth stack frame is related to a type of a high-level programming language corresponding to the fourth function. The method further includes: the performing stack tracing on the fourth stack frame includes: obtaining a second return address in the fourth stack frame, where the second return address points to a fifth function, and the fifth function is a function that calls the fourth function; and when the second return address belongs to the return address set, setting a stack frame type of a fifth stack frame to a second type, where the fifth stack frame is a stack frame corresponding to the fifth function, and the second type indicates that the fifth function is the boundary function; and setting a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame; or when a return address in the fourth stack frame does not belong to the return address set, setting the stack frame type of the fifth stack frame to the first type, where the fifth stack frame is the stack frame corresponding to the fifth function.

That the stack frame type of the fourth stack frame is related to a type of a high-level programming language corresponding to the fourth function indicates that the fourth stack frame may be a stack frame corresponding to any non-boundary function in the call stack. This is because the boundary function added in the process of creating the call stack is implemented by using a compiler or through hand-written assembly, and therefore there is no corresponding high-level programming language, and a stack frame type of a stack frame corresponding to the boundary function has been identified in an unwind stack process of a stack frame corresponding to the non-boundary function.

The second return address included in the fourth stack frame is first obtained, and then whether the second return address is in the return address set is determined. There are mainly two cases:

(1) If the second return address does not belong to the return address set, it indicates that the fifth function pointed to by the second return address is not a boundary function, that is, the high-level programming language for writing the fourth function is the same as a high-level programming language for writing the fifth function. Therefore, the stack frame type of the fourth stack frame is the same as the stack frame type of the fifth stack frame, and the stack frame type of the fifth stack frame may be set to the first type that is the same as the type of the first stack frame. In addition, both the fourth function and the fifth function belong to functions in the first program or functions in the runtime library.

(2) If the second return address belongs to the return address set, it indicates that the fifth function pointed to by the second return address is a boundary function, and the stack frame type of the fifth stack frame corresponding to the fifth function is set to the second type. The second type is determined by a label corresponding to the second return address. A high-level programming language corresponding to the sixth function that calls the fifth function is different from the high-level programming language corresponding to the fourth function, and the sixth stack frame may be set to the third type based on the label corresponding to the second return address. The third type is different from the first type. For a process of determining the second type and the third type by using the label corresponding to the second return address, refer to the corresponding process of the label corresponding to the first return address in the foregoing embodiment. Details are not described herein again. In this case, the fourth function and the sixth function may be functions that both belong to the first program, or the fourth function is a function in the first program and the sixth function is a function in the runtime library, or the fourth function is a function in the runtime library and the sixth function is a function in the first program.

In terms of technical effects, in the process of creating the call stack, a return address pointing to the boundary function is added to the return address set. Therefore, in the unwind stack process, a stack frame type of a related stack frame may be directly determined based on whether the return address belongs to the return address set and a label corresponding to the return address in the return address set. In comparison with the conventional technology in which a large return address data table or data structure is maintained in the runtime library and a stack frame type is determined through table lookup, this embodiment of this application can eliminate maintenance overheads and required table lookup duration of the return address data table or data structure in the runtime library, thereby effectively shortening unwind stack duration, and significantly improving unwind stack performance without affecting a non-unwind stack scenario.

When the first function calls the second function, and the second function calls the third function, in an unwind stack process, the fourth stack frame, the fifth stack frame, and the sixth stack frame may be respectively the third stack frame, the second stack frame, and the first stack frame. When the third function calls the second function, and the second function calls the first function, in an unwind stack process, the fourth stack frame, the fifth stack frame, and the sixth stack frame may be respectively the first stack frame, the second stack frame, and the third stack frame.

In an implementation, the second type and the third type are two stack frame types indicated by the label corresponding to the second return address.

The second type and the third type are determined based on characters included in the label corresponding to the second return address. For a process, refer to the description of the data packet format of the label corresponding to the first return address. Details are not described herein again.

In an implementation, the method further includes: obtaining a frame pointer FP in the fourth stack frame; and if the FP points to the stack bottom of the call stack, ending an unwind stack process of the fourth stack frame.

Before it is determined whether the second return address included in the fourth stack frame belongs to the return address set, the frame pointer (FP) included in the fourth stack frame is obtained, and whether the fourth stack frame is located at the stack bottom of the call stack is determined based on the FP in the fourth stack frame. In this case, there are two cases:

(1) When the FP indicates that the fourth stack frame is located at the bottom of the call stack, the unwind stack process of the fourth stack frame is ended.

(2) When the FP indicates that the fourth stack frame is not the stack bottom of the call stack, whether the second return address included in the fourth stack frame belongs to the return address set starts to be determined, and the stack frame types of the fifth stack frame and the sixth stack frame are correspondingly determined. For a determining process, refer to the foregoing embodiment. Details are not described herein again.

Optionally, that whether the fourth stack frame is located at the stack bottom of the call stack is determined based on the FP includes: determining whether the FP is equal to a preset value, to determine whether the fourth stack frame is located at the stack bottom of the call stack. Further, the preset value may be equal to 0. When the FP is equal to 0, it indicates that the fourth stack frame is located at the stack bottom of the call stack. When the FP is not equal to 0, it indicates that the fourth stack frame is not at the stack bottom of the call stack.

In terms of technical effects, before a type of a corresponding stack frame is determined based on the return address, whether a current stack frame is located at the stack bottom of the call stack may be determined by using the FP, so as to ensure that the unwind stack process is successfully ended when the unwind stack process reaches the stack bottom of the call stack.

In an implementation, when the fourth stack frame is a stack frame at the stack top of the call stack, the first type is related to a type of a high-level programming language of the runtime library.

When stack tracing starts to be performed on the call stack, a runtime library interface is called, that is, a function corresponding to the stack frame at the stack top of the call stack is a function in a compiled runtime library. Therefore, for a stack frame on which stack tracing is performed for the first time, a stack frame type of the stack frame matches the type of the high-level programming language of the runtime library. For example, the high-level programming language of the runtime library is C++, and in this case, the first type is a C++ stack frame.

It should be understood that an unwind stack process of a stack frame corresponding to another non-boundary function in the call stack is correspondingly the same as the unwind stack process of the fourth stack frame. Details are not described herein again.

In terms of technical effects, when the unwind stack process is started, because the function corresponding to the stack frame at the stack top of the call stack is a function in the runtime library, a type of the stack frame at the stack top of the call stack is set to a stack frame type that is the same as a stack frame type of a high-level programming language corresponding to a function in the runtime library, to ensure that when no boundary function is encountered subsequently, a type of a stack frame corresponding to a call function of a function corresponding to a current stack frame is directly set to the first type. In this way, it is ensured that a stack frame type of each stack frame is accurately identified in the unwind stack process.

In terms of technical effects, in this embodiment of this application, for functions that have two call relationships in the high-level language code, that is, the first function and the third function, when types of the high-level programming languages corresponding to the functions are different, in the process of creating the call stack for the first program including the first function, a function (that is, the second function) is added between the first function and the third function, and the first return address pointing to the second function and the label corresponding to the first return address are stored. Because the label corresponding to the first return address indicates the stack frame type of the first stack frame, the stack frame type of the second stack frame, and the stack frame type of the third stack frame, in a scenario in which stack tracing needs to be performed subsequently, the stack frame types of the first stack frame, the second stack frame, and the third stack frame may be identified based on the label corresponding to the first return address. In comparison with a prior-art manner in which a large return address data table or data structure needs to be maintained in the runtime library in an unwind stack process, and a stack frame type is determined through table lookup, this embodiment of this application can eliminate maintenance overheads and required table lookup duration of the return address data table or data structure in the runtime library, thereby effectively shortening unwind stack duration, and significantly improving unwind stack performance without affecting a non-unwind stack scenario.

Figure 4:
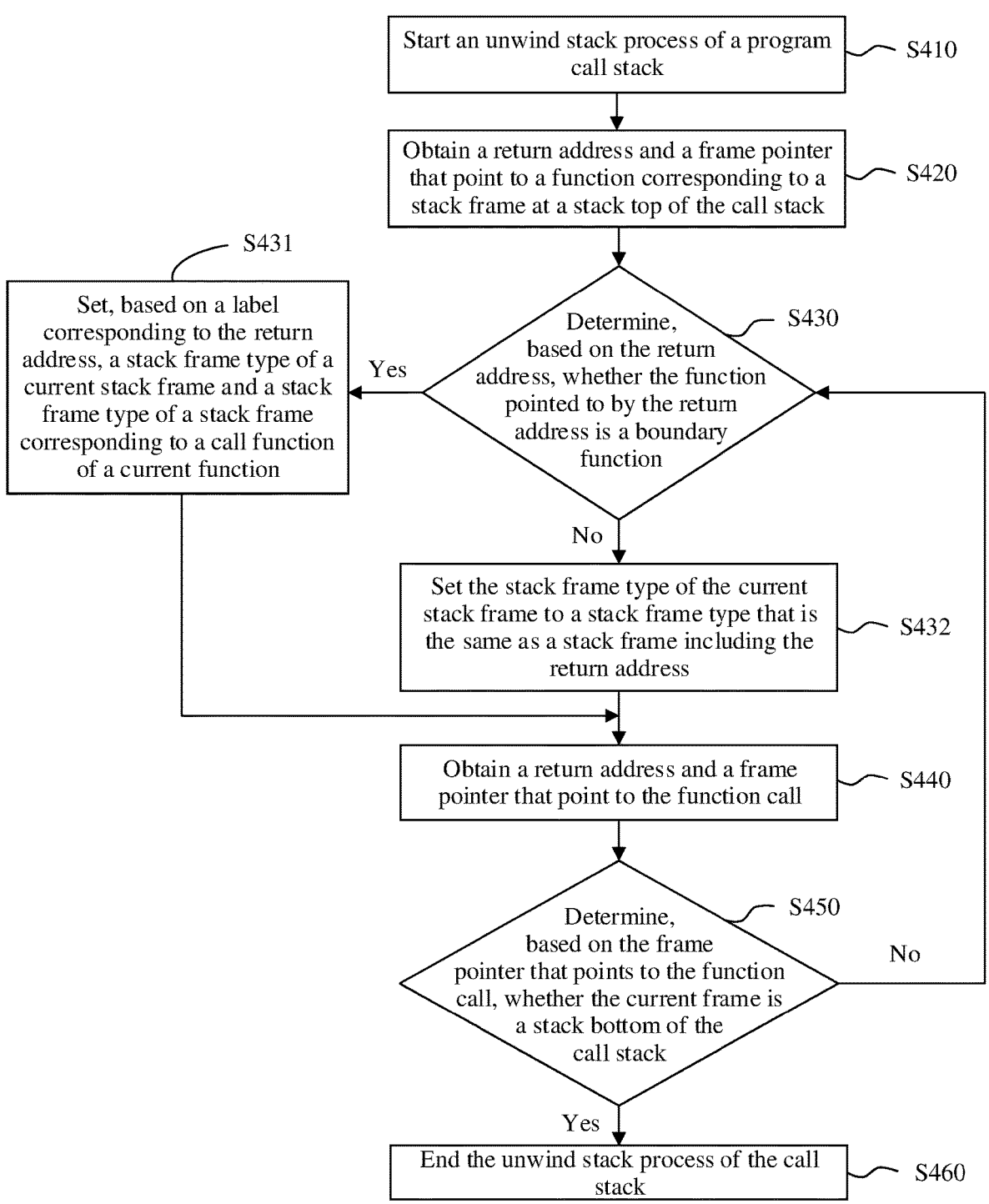
FIG. 4 is a flowchart of performing stack tracing by a program call stack according to an embodiment of this application.

Refer to FIG. 4. FIG. 4 is a flowchart of performing stack tracing by a program call stack according to an embodiment of this application. As shown in FIG. 4, an unwind stack process of the program call stack may be described by using a procedure shown in FIG. 4, including steps S410, S420, S430, S440, S450, and S460.

Step S410: Start the unwind stack process of the program call stack.

Step S420: Obtain a return address and a frame pointer that point to a function corresponding to a stack frame at the stack top of the call stack.

The return address and the frame pointer that point to the function corresponding to the stack frame at the stack top of the call stack are obtained through a runtime library interface, and the return address and the frame pointer are not stored in the call stack. In the following steps, a function pointed to by a return address is referred to as a current function, and a stack frame corresponding to the function pointed to by the return address is referred to as a current stack frame.

Step S430: Determine, based on the return address, whether the function pointed to by the return address is a boundary function.

Whether the function pointed to by the return address is the boundary function is determined by determining whether the return address belongs to a return address set.

If yes, step S431 is performed: Set, based on a label corresponding to the return address, a stack frame type of the current stack frame and a stack frame type of a stack frame corresponding to a call function of the current function. If no, step S432 is performed: Set the stack frame type of the current stack frame to a stack frame type that is the same as a stack frame including the return address. It should be understood that, in a first unwind stack process, in this case, the return address is stored in the call stack, and the stack frame type of the current stack frame matches a high-level programming language of a runtime library.

Step S440: Obtain a return address and a frame pointer that point to the function call.

If step S440 inherits step S431, in this case, the return address and the frame pointer of the call function are located in the stack frame corresponding to the call function of the current function. If step S440 inherits step S432, in this case, the return address and the frame pointer that point to the function call are located in the current stack frame, that is, the return address and the frame pointer that point to the function call are obtained from the current stack frame.

Step S450: Determine, based on the frame pointer that points to the function call, whether the current stack frame is the stack bottom of the call stack.

If yes, step S460 is performed: End the unwind stack process of the call stack. If no, step S430 is returned.

For a detailed execution process in the foregoing steps, refer to the description in the foregoing embodiment. Details are not described herein again.

Figure 5:
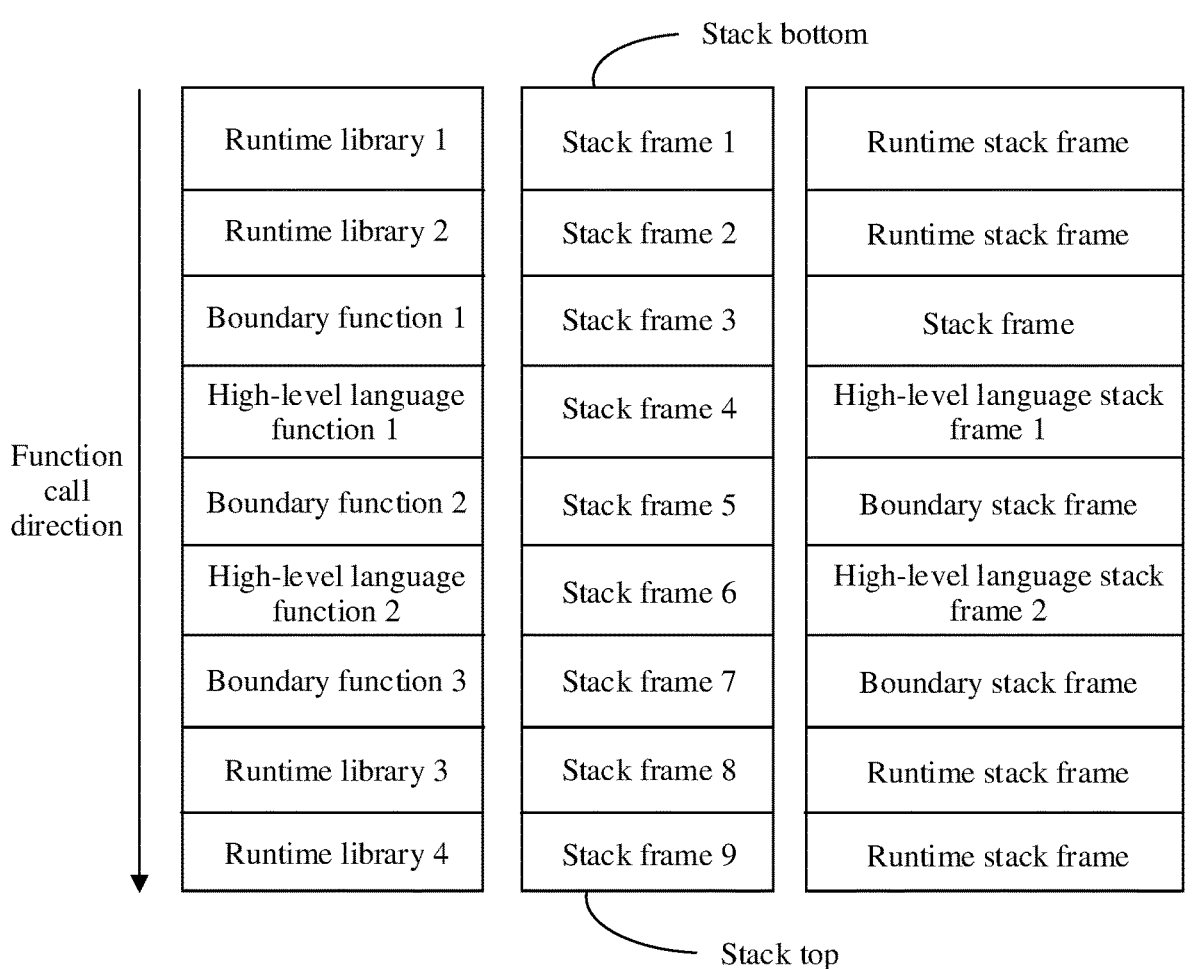
FIG. 5 is a diagram of an unwind stack process according to an embodiment of this application.

FIG. 5 is a diagram of an unwind stack process according to an embodiment of this application. As shown in FIG. 5, FIG. 5 includes three columns in total: a first column, a second column, and a third column from left to right. The second column is a call stack created in a running process of a program (which may be the first program in the foregoing embodiment), the first column is a function corresponding to each stack frame of the call stack in the second column, and the third column is a stack frame type of each stack frame in the call stack that is identified in the unwind stack process.

A high-level language function 1 and a high-level language function 2 may be functions in the first program, a runtime function 1 to a runtime function 4 are functions in a runtime library, and a boundary function 1 to a boundary function 3 are functions added in a process of creating the call stack.

It should be understood that, according to the foregoing embodiment, in the process of creating the call stack, a return address pointing to a boundary function 1, a return address pointing to a boundary function 2, and a return address pointing to a boundary function 3 (return addresses included in a stack frame 4, a stack frame 6, and a stack frame 8) are added to a return address set, and a return address pointing to another functions is not added to the return address set. In addition, a frame pointer included in the stack frame 1 indicates that the stack frame 1 is the stack bottom of the call stack.

The following describes the unwind stack process of the call stack with reference to FIG. 5.

First, an interface of the runtime library is called to obtain a return address and a frame pointer that point to a runtime function 4, and the return address and the frame pointer that point to the runtime function 4 do not exist in the call stack. That is, in a function call direction shown in FIG. 5, the return address and the frame pointer that point to a function at the last layer are not stored in the call stack. Because the return address pointing to the runtime function 4 does not belong to the return address set, the function pointed to by the return address may not be a boundary function. In this case, a type of a stack frame 9 corresponding to the runtime function 4 is set to a runtime stack frame (that is, matches a high-level programming language corresponding to the runtime library). For example, when the high-level programming language for writing the runtime library is C++, the runtime stack frame is a C++ stack frame.

A return address and a frame pointer that point to a call function (that is, a runtime function 3) of the runtime function 4 are obtained, that is, a return address and a frame pointer included in the stack frame 9 are obtained. Because the frame pointer included in the stack frame 9 indicates that the stack frame 9 is not the stack bottom of the call stack, and a return address in the stack frame 9 does not belong to the return address set, it indicates that a function pointed to by the return address is not a boundary function, that is, a high-level programming language for writing the runtime function 3 is the same as a high-level programming language for writing the runtime function 4. In this case, a type of the stack frame 8 is set to a runtime stack frame that is the same as the stack frame 9. A return address and a frame pointer that point to a call function of the runtime function 3 is obtained, that is, the return address and a frame pointer included in the stack frame 8 are obtained. Because the frame pointer included in the stack frame 8 indicates that the stack frame 8 is not the stack bottom of the call stack, and the return address included in the stack frame 8 belongs to the return address set, it indicates that a function corresponding to the return address is a boundary function (that is, the boundary function 3). A stack frame type of a stack frame 7 and a stack frame type of the stack frame 6 are identified based on a label corresponding to the return address. In this case, it may be identified that the type of the stack frame 7 is a second type (which may be indicated by a character in the label corresponding to the return address), the stack frame type of the stack frame 6 is a high-level language stack frame 2 (that is, the high-level language stack frame 2 matches a high-level programming language corresponding to the high-level language function 2), and a high-level programming language in which the high-level language function 2 is written is different from a high-level programming language in which the runtime function 3 is written.

A return address and a frame pointer that point to a call function of the high-level language function 2 are obtained, that is, the return address and a frame pointer included in the stack frame 6 are obtained. Because the frame pointer included in the stack frame 6 indicates that the stack frame 6 is not the stack bottom of the call stack, and the return address in the stack frame 6 belongs to the return address set, it indicates that a function pointed to by the return address is a boundary function (that is, the boundary function 2). A stack frame type of a stack frame 5 and a stack frame type of the stack frame 4 are identified based on the label corresponding to the return address. In this case, the type of the stack frame 5 may be identified as the second type, the stack frame type of the stack frame 4 is a high-level language stack frame 1 (that is, the high-level language stack frame 1 matches a high-level programming language corresponding to the high-level language function 1), and the high-level programming language for writing the high-level language function 1 is different from the high-level programming language for writing the high-level language function 2.

A return address and a frame pointer that point to a call function of the high-level language function 1 are obtained, that is, the return address and a frame pointer included in the stack frame 4 are obtained. Because the frame pointer included in the stack frame 4 indicates that the stack frame 4 is not the stack bottom of the call stack, and the return address in the stack frame 4 belongs to the return address set, it indicates that a function pointed to by the return address is a boundary function (that is, the boundary function 1). A stack frame type of the stack frame 3 and a stack frame type of the stack frame 2 are identified based on the label corresponding to the return address. In this case, the type of the stack frame 3 may be identified as the second type, the stack frame type of the stack frame 2 is a runtime stack frame, and a high-level programming language for writing a runtime function 2 is different from the high-level programming language for writing the high-level language function 1.

A return address and a frame pointer that point to a call function of the runtime function 2 is obtained, that is, a return address and a frame pointer included in the stack frame 2 are obtained. Because the frame pointer included in the stack frame 2 indicates that the stack frame 2 is not the stack bottom of the call stack, and the return address in the stack frame 2 does not belong to the return address set, it indicates that a function pointed to by the return address is not a boundary function, that is, the high-level programming language for writing the runtime function 1 is the same as the high-level programming language for writing the runtime function 2. A stack frame type of the stack frame 1 is set to a stack frame type that is the same as the stack frame type of the stack frame 2, that is, a runtime stack frame.

A return address and a frame pointer that point to a call function of the runtime function 1 is obtained, that is, the return address and the frame pointer included in the stack frame 1 are obtained. Because the frame pointer included in the stack frame 1 indicates that the stack frame 1 is the stack bottom of the call stack, the unwind stack process of the call stack is ended.

Figure 6:
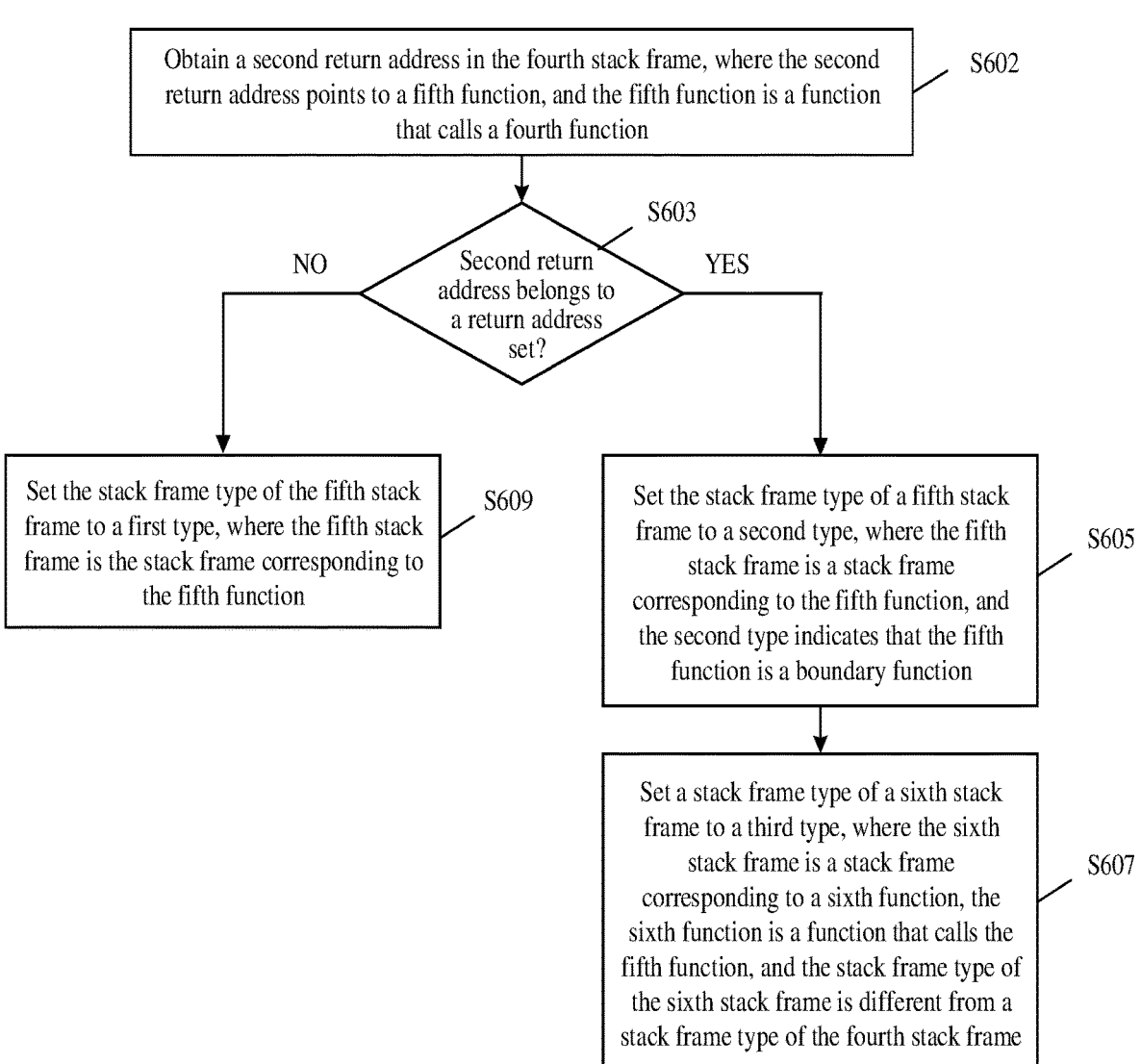
FIG. 6 is a flowchart of an unwind stack method according to an embodiment of this application.

FIG. 6 is a flowchart of an unwind stack method 600 according to an embodiment of this application. A call stack includes a fourth stack frame corresponding to a fourth function, a stack frame type of the fourth stack frame is a first type, and the stack frame type of the fourth stack frame is related to a type of a high-level programming language corresponding to the fourth function. As shown in FIG. 6, the method 600 includes the following steps.

Step S602: A second return address in the fourth stack frame is obtained. The second return address points to a fifth function, and the fifth function is a function that calls the fourth function. Step S603: A second return address is compared to a return address set. If the second return address belongs to the return address set, the method branches to Step S605. If the second return address does not belong to the return address set, then the method branches to Step S609. Step S605: A stack frame type of a fifth stack frame is set to a second type, where a function pointed to by each return address in a return address set is a boundary function, a call function of the boundary function and a called function of the boundary function correspond to different types of high-level programming languages, the fifth stack frame is a stack frame corresponding to the fifth function, and the second type indicates that the fifth function is the boundary function; and Step 607: A stack frame type of a sixth stack frame is set to a third type, where the sixth stack frame is a stack frame corresponding to a sixth function, the sixth function is a function that calls the fifth function, and the stack frame type of the sixth stack frame is different from the stack frame type of the fourth stack frame. S609: When the second return address does not belong to the return address set, the stack frame type of the fifth stack frame is set to the first type, where the fifth stack frame is the stack frame corresponding to the fifth function.

In an implementation, the second type and the third type are two stack frame types indicated by a label corresponding to the second return address. A label corresponding to each return address indicates a stack frame type of a stack frame corresponding to a function pointed to by each return address, and indicates a stack frame type of a stack frame corresponding to a caller function of the function pointed to by each return address.

In an implementation, a frame pointer FP in the fourth stack frame is obtained. If the FP points to the stack bottom of the call stack, the unwind stack process is ended.

In an implementation, when the fourth stack frame is a stack frame at the stack top of the call stack, the first type is related to a type of a high-level programming language of a runtime library.

In an implementation, the call stack is created in a process of calling the runtime library to run a first program, the first program includes a first function, the call stack includes a first stack frame corresponding to the first function, a second stack frame corresponding to a second function, a third stack frame corresponding to a third function, and the second function is a function added in a process of creating the call stack; there is a call relationship between the first function and the second function, and there is a call relationship between the second function and the third function; and the third function is a function in the first program or a function in the runtime library, and a high-level programming language corresponding to the first function is different from a high-level programming language corresponding to the third function. A first return address and a label corresponding to the first return address is stored, the first return address is a return address included in a stack frame corresponding to a function that is executed later in the first function and the third function, the label corresponding to the first return address indicates a stack frame type of the first stack frame, a stack frame type of the second stack frame, and a stack frame type of the third stack frame, and the first return address belongs to the return address set.

In an implementation, the first function calls the second function, the second function calls the third function, and the first return address is a return address included in the third stack frame, or the third function calls the second function, the second function calls the first function, and the first return address is a return address included in the first stack frame.

In an implementation, the second function is generated by using a compiler or through handwritten assembly, and is stored in a compiled high-level language code library or a compiled runtime code library.

For a process of the method 600, refer to the description in the foregoing embodiment. Details are not described herein again.

Figure 7:
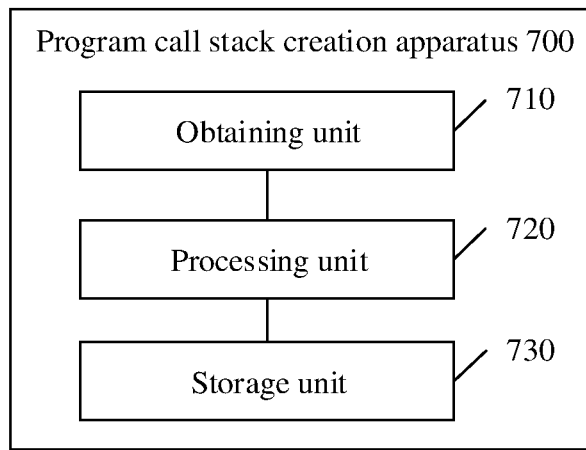
FIG. 7 is a diagram of a program call stack creation apparatus according to an embodiment of this application.

FIG. 7 is a diagram of a program call stack creation apparatus according to an embodiment of this application. As shown in FIG. 7, the apparatus 700 includes an obtaining unit 710, a processing unit 720, and a storage unit 730.

The obtaining unit 710 is configured to obtain a first program, where the first program includes a first function. The processing unit 720 is configured to: in a process of calling a runtime library to run the first program, add a second function and create a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function. The storage unit 730 is configured to store a first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame.

In an implementation, the first function calls the second function, the second function calls the third function, and the first return address is a return address included in the third stack frame, or the third function calls the second function, the second function calls the first function, and the first return address is a return address included in the first stack frame.

In an implementation, the second function is generated by using a compiler or through handwritten assembly, and is stored in a compiled high-level language code library or a compiled runtime code library.

In an implementation, the first return address is stored in a return address set, a function pointed to by each return address in the return address set is a boundary function, a call function of the boundary function and a called function of the boundary function correspond to different types of high-level programming languages, and a label corresponding to each return address indicates a stack frame type of a stack frame corresponding to the function pointed to by each return address, and indicates a stack frame type of a stack frame corresponding to a call function of the function pointed to by each return address.

In an implementation, the call stack includes a fourth stack frame corresponding to a fourth function, a stack frame type of the fourth stack frame is a first type, and the stack frame type of the fourth stack frame is related to a type of a high-level programming language corresponding to the fourth function. The processing unit 720 is further configured to perform stack tracing on the fourth stack frame. In the unwind stack process, the processing unit 720 is configured to: indicate the obtaining unit 710 to obtain a second return address in the fourth stack frame, where the second return address points to a fifth function, and the fifth function is a function that calls the fourth function; and when the second return address belongs to the return address set, set a stack frame type of a fifth stack frame to a second type, where the fifth stack frame is a stack frame corresponding to the fifth function, and the second type indicates that the fifth function is the boundary function; and set a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame; or when a return address in the fourth stack frame does not belong to the return address set, set the stack frame type of the fifth stack frame to the first type, where the fifth stack frame is the stack frame corresponding to the fifth function.

In an implementation, the second type and the third type are two stack frame types indicated by a label corresponding to the second return address.

In an implementation, the obtaining unit 710 is further configured to obtain a frame pointer FP in the fourth stack frame. The processing unit 720 is further configured to: when the FP points to the stack bottom of the call stack, end the unwind stack process of the fourth stack frame.

In an implementation, when the fourth stack frame is a stack frame at the stack top of the call stack, the first type is related to a type of a high-level programming language of the runtime library.

For an execution process of the apparatus 700, refer to the description corresponding to the method 300. Details are not described herein again.

Figure 8:
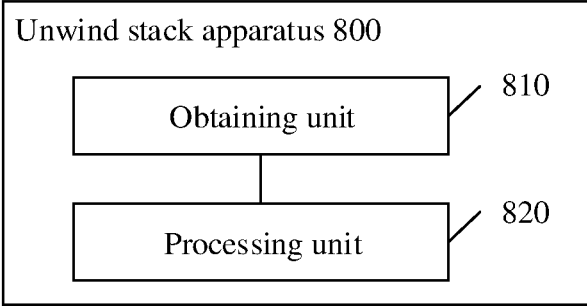
FIG. 8 is a diagram of an unwind stack apparatus according to an embodiment of this application.

FIG. 8 is a diagram of an unwind stack apparatus according to an embodiment of this application. A call stack includes a fourth stack frame corresponding to a fourth function, a stack frame type of the fourth stack frame is a first type, and the stack frame type of the fourth stack frame is related to a type of a high-level programming language corresponding to the fourth function. As shown in FIG. 8, the apparatus 800 includes an obtaining unit 810 and a processing unit 820.

The obtaining unit 810 is configured to obtain a second return address in the fourth stack frame, where the second return address points to a fifth function, and the fifth function is a function that calls the fourth function. The processing unit 820 is configured to: when the second return address belongs to a return address set, set a stack frame type of a fifth stack frame to a second type, where a function pointed to by each return address in the return address set is a boundary function, a call function of the boundary function and a called function of the boundary function correspond to different types of high-level programming languages, the fifth stack frame is a stack frame corresponding to the fifth function, and the second type indicates that the fifth function is the boundary function; and set a stack frame type of a sixth stack frame to a third type, where the sixth stack frame is a stack frame corresponding to a sixth function, the sixth function is a function that calls the fifth function, and the stack frame type of the sixth stack frame is different from the stack frame type of the fourth stack frame. Alternatively, when the second return address does not belong to the return address set, the processing unit sets the stack frame type of the fifth stack frame to the first type, where the fifth stack frame is the stack frame corresponding to the fifth function.

In an implementation, the second type and the third type are two stack frame types indicated by a label corresponding to the second return address. A label corresponding to each return address indicates a stack frame type of a stack frame corresponding to a function pointed to by each return address, and indicates a stack frame type of a stack frame corresponding to a caller function of the function pointed to by each return address.

In an implementation, the obtaining unit 810 is further configured to obtain a frame pointer FP in the fourth stack frame. The processing unit is further configured to: when the FP points to the stack bottom of the call stack, end an unwind stack process of the fourth stack frame.

In an implementation, when the fourth stack frame is a stack frame at the stack top of the call stack, the first type is related to a type of a high-level programming language of a runtime library.

In an implementation, the call stack is created in a process of calling the runtime library to run a first program, the first program includes a first function, the call stack includes a first stack frame corresponding to the first function, a second stack frame corresponding to a second function, a third stack frame corresponding to a third function, and the second function is a function added in a process of creating the call stack; there is a call relationship between the first function and the second function, and there is a call relationship between the second function and the third function; and the third function is a function in the first program or a function in the runtime library, and a high-level programming language corresponding to the first function is different from a high-level programming language corresponding to the third function. The apparatus further includes a storage unit 830. The storage unit 830 is configured to: store a first return address and a label corresponding to the first return address, where the first return address is a return address included in a stack frame corresponding to a function that is executed later in the first function and the third function, the label corresponding to the first return address indicates a stack frame type of the first stack frame, a stack frame type of the second stack frame, and a stack frame type of the third stack frame, and the first return address belongs to the return address set.

In an implementation, the first function calls the second function, the second function calls the third function, and the first return address is a return address included in the third stack frame, or the third function calls the second function, the second function calls the first function, and the first return address is a return address included in the first stack frame.

In an implementation, the second function is generated by using a compiler or through handwritten assembly, and is stored in a compiled high-level language code library or a compiled runtime code library.

For an execution process of the apparatus 800, refer to the description corresponding to the method 600. Details are not described herein again.

Figure 9:
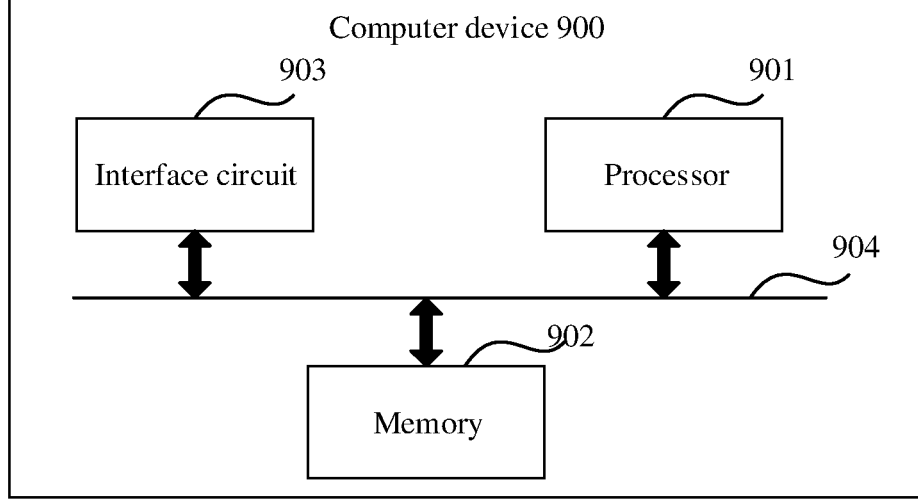
FIG. 9 is a diagram of a computer device according to an embodiment of this application.

FIG. 9 is a diagram of a computer device according to an embodiment of this application. As shown in FIG. 9, the device 900 includes a processor 901, a memory 902, an interface circuit 903, and a bus 904. The processor 901, the memory 902, and the interface circuit 903 perform data transmission through the bus 904.

The processor 901 is configured to: obtain a first program, where the first program includes a first function; and in a process of calling a runtime library to run the first program, add a second function and create a call stack, where the call stack includes a first stack frame corresponding to the first function, a second stack frame corresponding to the second function, and a third stack frame corresponding to a third function; there is a call relationship between the first function and the second function, and there is a call relationship between the second function and the third function; and the third function is a function in the runtime library or a function in the first program, and a high-level programming language corresponding to the first function is different from a high-level programming language corresponding to the third function. The memory 902 is configured to store a first return address and a label corresponding to the first return address, where the first return address is a return address included in a stack frame corresponding to a function that is executed later in the first function and the third function, and the label corresponding to the first return address indicates a stack frame type of the first stack frame, a stack frame type of the second stack frame, and a stack frame type of the third stack frame.

The processor 901 is further configured to perform stack tracing on a fourth stack frame, including: obtaining a second return address in the fourth stack frame, where the second return address points to a fifth function, and the fifth function is a function that calls a fourth function; and when the second return address belongs to a return address set, setting a stack frame type of a fifth stack frame to a second type, where the fifth stack frame is a stack frame corresponding to the fifth function, and the second type indicates that the fifth function is the boundary function; and setting a stack frame type of a sixth stack frame to a third type, where the sixth stack frame is a stack frame corresponding to a sixth function, the sixth function is a function that calls the fifth function, and the stack frame type of the sixth stack frame is different from a stack frame type of the fourth stack frame;

or when a return address in the fourth stack frame does not belong to the return address set, setting the stack frame type of the fifth stack frame to a first type, where the fifth stack frame is the stack frame corresponding to the fifth function.

For running processes of the processor and the memory on the computer device 900 in this embodiment of this application, refer to corresponding processes in the foregoing method embodiments 300 and 600. Details are not described herein again.

This application provides a computer-readable storage medium. The computer-readable storage medium stores program instructions, and when the program instructions are run on one or more processors, some or all of the steps in the method embodiments in FIG. 3 and/or FIG. 6 are implemented.

This application provides a computer program product. When the computer program product runs on a computer device, some or all of the steps in the method in FIG. 3 and/or FIG. 6 are implemented.

In the foregoing embodiments, description of each embodiment has respective focuses. For a part that is not described in detail in an embodiment, refer to related descriptions in other embodiments. It should be noted that, for brief description, the foregoing method embodiments are represented as a series of actions. However, persons skilled in the art should appreciate that this application is not limited to the described order of the actions, because according to this application, some steps may be performed in another order or simultaneously. It should be further appreciated by persons skilled in the art that embodiments described in this specification all belong to preferred embodiments, and the involved actions and modules are not necessarily required by this application.

In the several embodiments provided in this application, it should be understood that the disclosed apparatus may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. All or a part of the units may be selected based on actual requirements to achieve the objectives of the solutions of embodiments.

The foregoing embodiments are merely intended for describing the technical solutions of this application rather than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of this application.

What is claimed:

1. A program call stack creation method, comprising:
  obtaining a first program, the first program comprising a first function;
  in a process of calling a runtime library to run the first program, adding a second function and creating a call stack, the call stack comprising a first stack frame corresponding to the first function, a second stack frame corresponding to the second function, and a third stack frame corresponding to a third function, there being a call relationship between the first function and the second function, there being a call relationship between the second function and the third function, the third function is a function in the runtime library or a function in the first program, and a high-level programming language corresponding to the first function is different from a high-level programming language corresponding to the third function; and
  storing a first return address and a label corresponding to the first return address, the first return address comprising a return address comprised in a stack frame corresponding to a function that is executed later in the first function and the third function, and the label corresponding to the first return address indicating a stack frame type of the first stack frame, a stack frame type of the second stack frame, and a stack frame type of the third stack frame, a stack frame type being related to a type of a high-level programming language of the runtime library.

2. The method according to claim 1, wherein the first function calls the second function, the second function calls the third function, and the first return address comprising a return address comprised in the third stack frame; or the third function calls the second function, the second function calls the first function, and the first return address comprising a return address comprised in the first stack frame.

3. The method according to claim 1, wherein the second function is generated by a compiler or through handwritten assembly, and is stored in a compiled high-level language code library or a compiled runtime code library.

4. The method according to claim 1, wherein the first return address is stored in a return address set, a function pointed to by each return address in the return address set is a boundary function, a call function of the boundary function and a called function of the boundary function correspond to different types of high-level programming languages, and a label corresponding to each return address indicates a stack frame type of a stack frame corresponding to the function pointed to by each return address, and indicates a stack frame type of a stack frame corresponding to a call function of the function pointed to by each return address.

5. The method according to claim 4, wherein the call stack comprises a fourth stack frame corresponding to a fourth function, a stack frame type of the fourth stack frame is a first type, and the stack frame type of the fourth stack frame is related to a type of a high-level programming language corresponding to the fourth function, the method further comprising:
  performing stack tracing on the fourth stack frame comprises:
  obtaining a second return address in the fourth stack frame, wherein the second return address points to a fifth function, and the fifth function is a function that calls the fourth function; and
  when the second return address belongs to the return address set, setting a stack frame type of a fifth stack frame to a second type, wherein the fifth stack frame is a stack frame corresponding to the fifth function, and the second type indicates that the fifth function is the boundary function, and setting a stack frame type of a sixth stack frame to a third type, wherein the sixth stack frame is a stack frame corresponding to a sixth function, the sixth function is a function that calls the fifth function, and the stack frame type of the sixth stack frame is different from the stack frame type of the fourth stack frame; or
  when a return address in the fourth stack frame does not belong to the return address set, setting the stack frame type of the fifth stack frame to the first type, wherein the fifth stack frame is the stack frame corresponding to the fifth function.

6. The method according to claim 5, wherein the second type and the third type are two stack frame types indicated by a label corresponding to the second return address.

7. The method according to claim 5, wherein the method further comprises:
  obtaining a frame pointer (FP) in the fourth stack frame; and
  if the FP points to a stack bottom of the call stack, ending the unwind stack process of the fourth stack frame.

8. The method according to claim 5, wherein when the fourth stack frame is a stack frame at a stack top of the call stack, the first type is related to a type of a high-level programming language of the runtime library.

9. An unwind stack method for a call stack, the call stack including a fourth stack frame corresponding to a fourth function, a stack frame type of the fourth stack frame including a first type, the stack frame type of the fourth stack frame being related to a type of a high-level programming language corresponding to the fourth function, a stack frame type being related to a type of a high-level programming language of a runtime library, the method comprising:

obtaining a second return address in the fourth stack frame, the second return address pointing to a fifth function, and the fifth function comprising a function that calls the fourth function; and setting a stack frame type of a fifth stack frame to a second type when the second return address belongs to a return address set, a function pointed to by each return address in the return address set comprising a boundary function, a call function of the boundary function and a called function of the boundary function corresponding to different types of high-level programming languages, the fifth stack frame comprising a stack frame corresponding to the fifth function, the second type indicating that the fifth function comprising the boundary function, setting a stack frame type of a sixth stack frame to a third type, the sixth stack frame comprising a stack frame corresponding to a sixth function, the sixth function comprising a function that calls the fifth function, and the stack frame type of the sixth stack frame is different from the stack frame type of the fourth stack frame; or setting the stack frame type of the fifth stack frame to the first type when the second return address does not belong to the return address set, the fifth stack frame comprising the stack frame corresponding to the fifth function.

10. The method according to claim 9, wherein the second type and the third type are two stack frame types indicated by a label corresponding to the second return address; and a label corresponding to each return address indicates a stack frame type of a stack frame corresponding to a function pointed to by each return address, and indicates a stack frame type of a stack frame corresponding to a caller function of the function pointed to by each return address.

11. The method according to claim 9, wherein the method further comprises:

obtaining a frame pointer FP in the fourth stack frame; and ending the unwind stack process if the FP points to a stack bottom of the call stack.

12. The method according to claim 9, wherein when the fourth stack frame is a stack frame at a stack top of the call stack, the first type is related to a type of a high-level programming language of a runtime library.

13. An unwind stack apparatus, comprising:

a memory storing instructions; and at least one processor in communication with the memory, the at least one processor configured, upon execution of the instructions, to perform the following steps:

obtaining a first program, the first program comprising a first function;

in a process of calling a runtime library to run the first program, adding a second function and creating a call stack, the call stack comprising a first stack frame corresponding to the first function, a second stack frame corresponding to the second function, and a third stack frame corresponding to a third function, there being a call relationship between the first function and the second function, there being a call relationship between the second function and the third function, the third function is a function in the runtime library or a function in the first program, and a high-level programming language corresponding to the first function is different from a high-level programming language corresponding to the third function; and storing a first return address and a label corresponding to the first return address, the first return address comprising a return address comprised in a stack frame corresponding to a function that is executed later in the first function and the third function, the label corresponding to the first return address indicating a stack frame type of the first stack frame, a stack frame type of the second stack frame, and a stack frame type of the third stack frame, a stack frame type being related to a type of a high-level programming language of the runtime library.

14. The apparatus according to claim 13, wherein the first function calls the second function, the second function calls the third function, and the first return address comprising a return address comprised in the third stack frame; or the third function calls the second function, the second function calls the first function, and the first return address comprising a return address comprised in the first stack frame.

15. The apparatus according to claim 13, wherein the second function is generated by a compiler or through handwritten assembly, and is stored in a compiled high-level language code library or a compiled runtime code library.

16. The apparatus according to claim 13, wherein the first return address is stored in a return address set, a function pointed to by each return address in the return address set is a boundary function, a call function of the boundary function and a called function of the boundary function correspond to different types of high-level programming languages, and a label corresponding to each return address indicates a stack frame type of a stack frame corresponding to the function pointed to by each return address, and indicates a stack frame type of a stack frame corresponding to a call function of the function pointed to by each return address.

17. A non-transitory computer-readable storage media storing computer instructions that configure at least one processor, upon execution of the instructions, to perform the following steps:

obtaining a first program, the first program comprising a first function;

in a process of calling a runtime library to run the first program, adding a second function and creating a call stack, the call stack comprising a first stack frame corresponding to the first function, a second stack frame corresponding to the second function, and a third stack frame corresponding to a third function, there being a call relationship between the first function and the second function, there being a call relationship between the second function and the third function, the third function is a function in the runtime library or a function in the first program, and a high-level programming language corresponding to the first function is different from a high-level programming language corresponding to the third function; and storing a first return address and a label corresponding to the first return address, the first return address comprising a return address comprised in a stack frame corresponding to a function that is executed later in the first function and the third function, the label corresponding to the first return address indicating a stack frame type of the first stack frame, a stack frame type of the second stack frame, and a stack frame type of the third stack frame, a stack frame type being related to a type of a high-level programming language of the runtime library.

18. The non-transitory computer-readable storage medium according to claim 17, wherein the first function calls the second function, the second function calls the third function, and the first return address comprising a return address comprised in the third stack frame; or the third function calls the second function, the second function calls the first function, and the first return address comprising a return address comprised in the first stack frame.

19. The non-transitory computer-readable storage medium according to claim 17, wherein the second function is generated by a compiler or through handwritten assembly, and is stored in a compiled high-level language code library or a compiled runtime code library.

20. The non-transitory computer-readable storage medium according to claim 17, wherein the first return address is stored in a return address set, a function pointed to by each return address in the return address set is a boundary function, a call function of the boundary function and a called function of the boundary function correspond to different types of high-level programming languages, and a label corresponding to each return address indicates a stack frame type of a stack frame corresponding to the function pointed to by each return address, and indicates a stack frame type of a stack frame corresponding to a call function of the function pointed to by each return address.

*     *     *     *     *